United States Patent
Gehring et al.

(10) Patent No.: US 9,316,724 B2
(45) Date of Patent: Apr. 19, 2016

(54) OPTOELECTRONIC SENSOR FOR THE DETECTION OF OBJECTS

(71) Applicant: SICK AG, Waldkirch (DE)

(72) Inventors: Roland Gehring, Waldkirch (DE); Ralf Ulrich Nubling, Waldkirch (DE); Sebastian Pastor, Waldkirch (DE)

(73) Assignee: Sick AG, Waldkirch (DE)

( * ) Notice: Subject to any disclaimer, the term of this patent is extended or adjusted under 35 U.S.C. 154(b) by 224 days.

(21) Appl. No.: 14/109,298

(22) Filed: Dec. 17, 2013

(65) Prior Publication Data
US 2014/0166866 A1 Jun. 19, 2014

(30) Foreign Application Priority Data
Dec. 18, 2012 (EP) ..................... 12197854

(51) Int. Cl.
| | | |
|---|---|---|
| *G01V 8/18* | (2006.01) | |
| *G01S 7/481* | (2006.01) | |
| *G01S 17/42* | (2006.01) | |
| *G02B 26/10* | (2006.01) | |

(52) U.S. Cl.
CPC ............. *G01S 7/4812* (2013.01); *G01S 7/4817* (2013.01); *G01S 17/42* (2013.01); *G02B 26/105* (2013.01)

(58) Field of Classification Search
CPC ......... G01V 8/18; G01S 17/06; G01S 7/4812; G01S 7/4817; G01S 17/42; G02B 6/105
USPC .................. 250/234; 340/555; 356/4.01, 5.01
See application file for complete search history.

(56) References Cited

U.S. PATENT DOCUMENTS

| | | | |
|---|---|---|---|
| 5,689,328 A | 11/1997 | Katayama | |
| 8,059,263 B2 | 11/2011 | Haberer et al. | |
| 2009/0002678 A1* | 1/2009 | Tanaka | G01S 7/4813 356/4.01 |
| 2012/0249996 A1 | 10/2012 | Tanaka et al. | |

FOREIGN PATENT DOCUMENTS

| | | |
|---|---|---|
| DE | 19741730 B4 | 2/2006 |
| DE | 102008032216 A1 | 1/2010 |
| DE | 202009012114 U1 | 3/2011 |
| DE | 102012102244 A1 | 10/2012 |
| EP | 1286178 A2 | 2/2003 |
| EP | 1965225 A2 | 9/2008 |

* cited by examiner

*Primary Examiner* — Seung C Sohn
(74) *Attorney, Agent, or Firm* — Nath, Goldberg & Meyer; Jerald L. Meyer

(57) ABSTRACT

An optoelectronic sensor (10), in particular a laser scanner, for the detection of objects in a monitored zone (20) having a more than one scanning plane is provided which comprises a light transmitter (12) for the transmission of a light beam (16), a drive (28) for generating a rotational movement, a deflection unit (18, 62) rotatable about an axis of rotation (30) by the drive (28) for the periodic deflection of the light beam (16), a light receiver (26) for generating a received signal from the light beam (22) remitted or reflected from the monitored zone (20), and comprising an evaluation unit (46) which is configured for the detection of the objects on the basis of the received signal, wherein the deflection unit (18, 62) can be tilted in order to vary the scanning plane. In this connection the drive (28) tilts the deflection unit (18, 62) at the same time as the rotational movement.

18 Claims, 3 Drawing Sheets

OPTOELECTRONIC SENSOR FOR THE DETECTION OF OBJECTS

Figure 1:
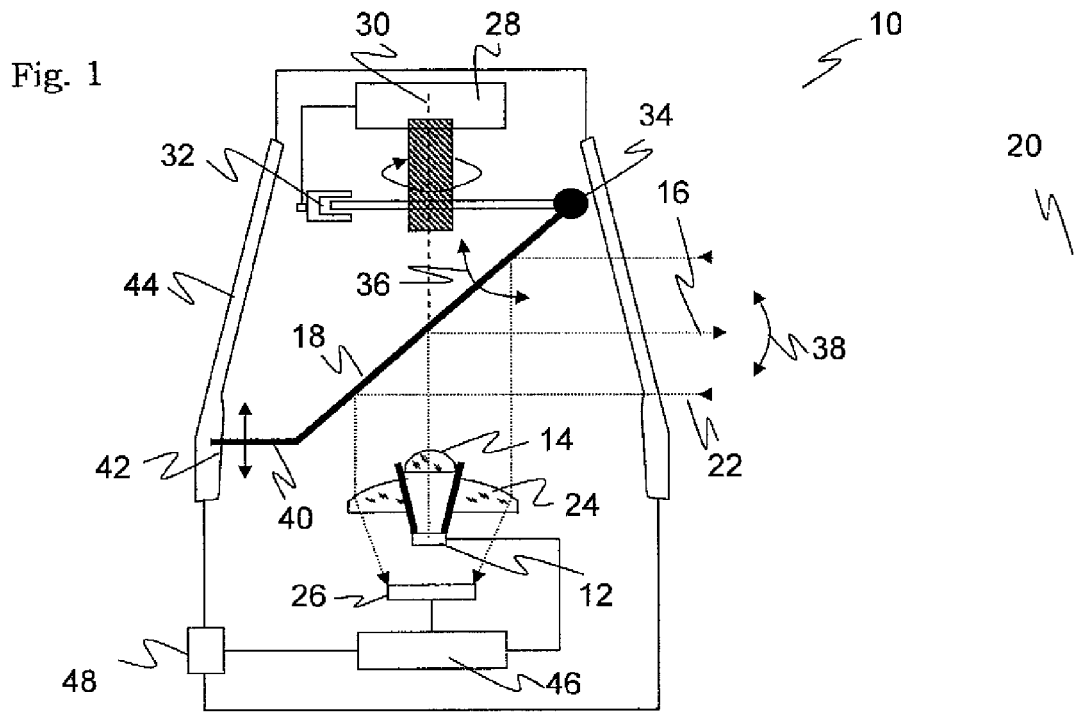

The invention relates to an optoelectronic sensor and to a method for the detection of objects in accordance with the preamble of claim 1.

Scanners are used for various monitoring tasks and measurement tasks. For this purpose a sampling beam or a scanning beam scans a zone and evaluates the remitted or reflected light. In order to also gain information on the object distances, object contours or object sections the presence of objects is generally determined, but also at the same their distance. Such distance measuring laser scanners work in accordance with a principle of time of light in which the running time from the scanner into the scenery and back is measured and distance data is calculated on the basis of the speed of light.

Two types of the time of light method are widely used. For phase-based methods the light transmitter modulates the scanning beam and the phase between a reference and the received scanning beam is determined. Pulse-based methods impinge a significant pattern onto the scanning beam, for example, a narrow pulse of only a few nanoseconds duration, and then determine the reception point of time of this pattern. In a generalization referred to as a pulse averaging method, a plurality of pulses or a pulse sequence is transmitted and the received pulses are statistically evaluated.

Known laser scanners have a rotating mirror or a polygonal wheel in order to periodically scan a monitored plane or a segment of a monitored plane. However, many applications require the scanning of a three-dimensional spatial zone and not just that of a surface. A common alternative consists therein of ensuring a relative movement between the laser scanner and the objects, such as for example, in the DE 197 41 730 B4. This requires a considerable increase in demand in effort and cost and numerous applications are not even suitable for such a controlled relative movement.

In order to avoid a movement of the laser scanner with respect to the object to be measured, laser scanners are adapted as a 3D scanner. In the DE 10 2008 032 216 A1, for example, the complete scanning unit comprising transmitter, receiver and rotary mirror is arranged on a deflection plate. The scanning plane is then varied by pivoting the deflection plate in order to thus completely monitor a three-dimensional spatial zone. However, this requires a considerable increase in additional demand in effort and cost with respect to the deflection plate and the additional pivoting drive.

A multi-planar scanning as a step in the direction of a 3D scanner can also be achieved in that a sampling mirror having differently tilted facets is used as a deflection unit. Thereby, an angular displacement of the scanning plane respectively associated with a facet arises. However, at the same time the scanning angular region of the respective scanning plane is limited to the angular portion of the facet of typically less than 100°. The EP 1 286 178 A2 monitors a main scanning plane in accordance with a very similar principle in a forward angular region of almost 180° and in a backward angular region monitors two further scanning planes by means of two mirrors tilted by a few degrees which are limited to an angular region of 40°.

As a further solution it is known to use an additional deflection unit generally in the form of an oscillating mirror which ensures a deflection of the scanning beam in a second direction. Thereby, the scanning plane can be pivoted. However, increased cost and a larger spatial requirement arise, thus a high optical and mechanical demand demanding in effort and cost which at the same time has additional transmission and reception signal losses through the use of two deflection units.

In a specific solution having an additional oscillating mirror in accordance with the DE 20 2009 012 114 U1 the 360° scanning zone of a rotating mirror is divided. In a forward angular region a surface is scanned in a common manner. In a rearward angular region the scanning beam is deflected a multiple of times and is then incident on an oscillating mirror which is pivoted in a direction transverse to the deflection direction of the rotating mirror. Thus, a spatial section is scanned across the rear angular region rather than a surface.

In view of this background it is the object of the invention to enable the enlargement of the monitored zone of an optoelectronic sensor using simple means.

This object is satisfied by an optoelectronic sensor and by a method for the detection of objects in accordance with claim 1. In this connection the invention is based on the basic idea of detecting more than one scanning plane by means of a deflection unit moved two-dimensionally via an actor. The scanning plane defined by the axis of rotation of a common 2D scanner is varied by tilting. Thereby a spatial zone can be monitored using simple means which is larger than the sampling plane or scanning plane arising through a pure rotation of the deflection unit.

Thus, for example, a multi-planar scanner arises in which the tilting is maintained constant over angular regions in order to respectively detect scanning planes or angular sections thereof corresponding to the constant tilting. On the other hand, the tilting can, however, also take place continuously in such a way that a scanning plane in the actual sense no longer exists, but rather only a spatial zone covered by the scanning beam through the superposition of the rotational movement and the tilting.

A detection of an object using laser scanners generally also comprises a determination of the position through a measurement of the distance using a time of light method mentioned in the introduction, a determination of the angle of rotation of the deflection unit via an angle encoder, as well as a determination of the tilt angle by means of the angle of rotation and the known angular dependent extent of the tilt movement. Thereby, the radius and both angles of the three-dimensional spherical coordinates are determined.

The invention has the advantage that neither an additional drive nor an additional deflection unit are required in order to vary the scanning plane. Thereby manufacturing costs, construction size, mechanical susceptibility and the current consumption can be reduced. The provision of the tilting in this connection enables a matching of the scanning to the respective application.

The sensor preferably has a compulsory guidance which determines a respective tilt angle in dependence on the rotational movement. This compulsory guidance ensures that also the desired tilt angle is set during the rotational movement. In this connection the compulsory guidance predefines the desired tilt angle. This depends on the angular position, wherein, however, the provision is not limited to a 360° revolution, but rather the compulsory guidance can extend over a plurality of revolutions and only after which it can periodically repeat itself.

The compulsory guidance preferably has an engagement between a guide element connected to the deflection unit and a sectional track not following the rotational movement of the deflection unit. The guide element thus rotates with the deflection unit and tilts this in accordance with the predefined sectional track which is, for example, arranged in a base surface or a lateral housing part and is stationary with respect to the rotational movement. The sectional track predefines the tilt angles of the deflection unit by means of its geometry and in this way predefines the resulting monitored zone via the respective current orientation of the scanning plane. Variants of the sensor having an adapted monitored zone can easily be formed through a change of the sectional track. The engagement can, alternatively, be provided between a sectional track arranged at the deflection unit and a guide element not following the rotational movement.

The deflection unit is preferably stored at a joint position opposite the engagement. The deflection unit can be tilted at this joint position, for example, present in the form of a leaf spring, a film joint, an elastic plastic element produced by an injection molded process together with the deflection unit, a friction bearing, a spherical bearing or a roller bearing. The position of the joint position opposite the engagement does not necessarily mean diametrically opposite at the largest distance. Since the path between the engagement and the joint position determines the lever which brings about the tilting a certain minimum distance should, however, be maintained. However, for example, also a tiltable suspension at the axis of rotation is sufficient for this purpose rather than diametrically opposite the engagement.

The deflection unit is preferably a mirrored wheel having a plurality of facets, whose axis is arranged transverse with respect to the axis of rotation, in particular perpendicular to the axis of rotation. Such mirrored wheels, for example, formed as a polygonal mirrored wheel or as a scanning mirror, are typically oriented with their axis in the actual axis of rotation of the sensor and in this way perpendicular to the scanning plane in such a way that the facets consecutively deflect the scanning beam with each rotation. In contrast to this the mirrored wheel is installed here quasi endwise in such a way that the mirrored wheel generally does not turn about its own axis, but rather in its mirrored wheel plane. Thus, a respective facet acts over a large angular region like a common rotating mirror. The tilting is superimposed on the rotational movement in such a way that overall a kind of inclined rotation results. Each facet acts as a deflection unit with increasing tilting up until a different facet takes over and again runs through the region of the tilt angles. A calm, constant forward movement including the tilting arises which in contrast to a few other embodiments also has no jerky return which can only be used in a very limited manner for the actual scanning for the periodic restart of the tilting.

The facets preferably have different lengths and/or are tilted differently with respect to the axis. The mirrored wheel is thus not regular in this embodiment. The facets expand the compulsory guided tilt movement over different angular regions or rotations or lead to an additional displacement through an own mutual tilting angle. Thereby, a varying scan zone results for each facet which does not periodically repeat itself already for each facet newly introduced into the scanning beam but only after a complete run through over all facets. Alternatively, the facets can describe an equilateral polygon in the circumferential direction and with their respective short side stand transverse to the circumference perpendicular or at least stand at the same angle with regard to one another with respect to the incoming scanning beam. Then each facet scans the same monitored zone. The deflection unit preferably has a plurality of guide elements which are alternatively in engagement with a sectional track. Thereby, for example, each facet is respectively guided in the sectional track by an associated guide element. The alternating engagement of the guide elements can be precisely coordinated, this means that a guide element leaves the sectional track precisely at that moment at which the next guide element comes into engagement with the sectional track. However, it is also plausible that a certain overlap is present in which the current and the next guide element are simultaneously in engagement with the sectional track, or vice versa that a short idle time is present prior to the next guide element engaging. Thus overall a single uninterrupted and continuous compulsory guidance without return or similar irregular sequences arises.

The sectional track preferably has a groove and the guide element has a spigot running in the groove. Both should be understood in a broad sense. The groove determines the sectional track at which the spigot should move as an arbitrarily formed guide element. This takes place in a friction-low manner since the required force for the compulsory guidance remains very small. Only so much force has to be applied as is required for the holding of the deflection unit designed for this manipulation through the compulsory guidance at the respectively desired tilt angle. Nevertheless the mechanical loading can, for example, be further reduced through a friction means or a roller means at the spigot or a suitable selection of stable and at the same time friction low materials.

The sectional track preferably has a web and the guide element has at least one guide roller, in particular two guide rollers, gripping around the web. This results in a particularly smooth running compulsory guidance with a low mechanical load. At least one of the guide rollers can be spring-loaded in order to obtain a compulsory guidance without play while the other guide roller acts as a counter pressure element such that the spring force does not influence the rotational drive.

The sectional track preferably varies the distance with respect to the axis of rotation in a relief section. While grooves and webs displace the guide element in parallel to the axis of rotation, the relief section varies the distance with respect to the axis of rotation. Through a suitably assembled and arranged guide element this relief section brings about a corresponding tilting of the deflection unit. The deflection via a relief section can be combined with a shift in parallel to the axis of rotation at approximately the center of a groove or of a web.

The sectional track preferably has an ascending straight and a return. A sectional track is best described in cylinder coordinates due to the rotational movement. In this example and in the following, however, jacket surfaces will generally be considered for the purpose of illustration in which the angular coordinates are treated like a Cartesian coordinate. An ascending straight thus actually corresponds to a spiral and leads to a uniform tilting during the rotational movement. An actual scanning plane thus does not exist, rather more a spatial zone is scanned in a spiral-shaped manner. The ascent can be changed at one or more points in order to obtain part spirals of different pitch. The deflection unit is returned to the start of the sectional track at the end of the sectional track via a preferably short, inclined and still as flat as possible insertable return piece.

The sectional track preferably has a plurality of horizontal part sections connected by short ascents. Each part section defines a scanning plane or an angular section thereof. An angular displacement of the scanning plane takes place through the short ascents. A return between the end and the start of the sectional track is also provided in this example in addition to the ascents.

The sectional track preferably has at least one periodic oscillation. This oscillation should lead to an as smooth as possible movement, such as for example through a sinusoidal curve. Plausible are also a plurality of encapsulated oscillations as a sectional track in such a way that the generally predefined movement of the tilting only repeats itself after a plurality of rotations.

Alternatively the sectional track can be designed as a free shape in order to practically achieve arbitrary scans of desired spatial zones. In this connection arbitrary mixing shapes of straight pieces, horizontal part sections, oscillations and other curved extents are plausible. The spatial zone to be scanned can thus be configured through a change of the sectional track, for example, by the provision of a number of housing covers having a corresponding sectional track.

The sectional track preferably has a setting element in order to displace, to expand or to compress the sectional track. Correspondingly, the monitored spatial zone is displaced and/or is scanned in a close meshed or large meshed manner in the angular direction of the tilting. Rather than exchanging the sectional track overall, which in practice generally leads to the use of a different sensor or at least to the use of a different sensor component, a settability or configuration of the present sectional track within certain boundaries is enabled in this example and in this way the sensor can be used in a more flexible manner.

The method in accordance with the invention can be adapted in a similar manner and in this connection shows similar advantages. Such advantageous features are described by way of example, but not conclusively in the subordinate claims adjoining the dependent claims.

Figure 2:
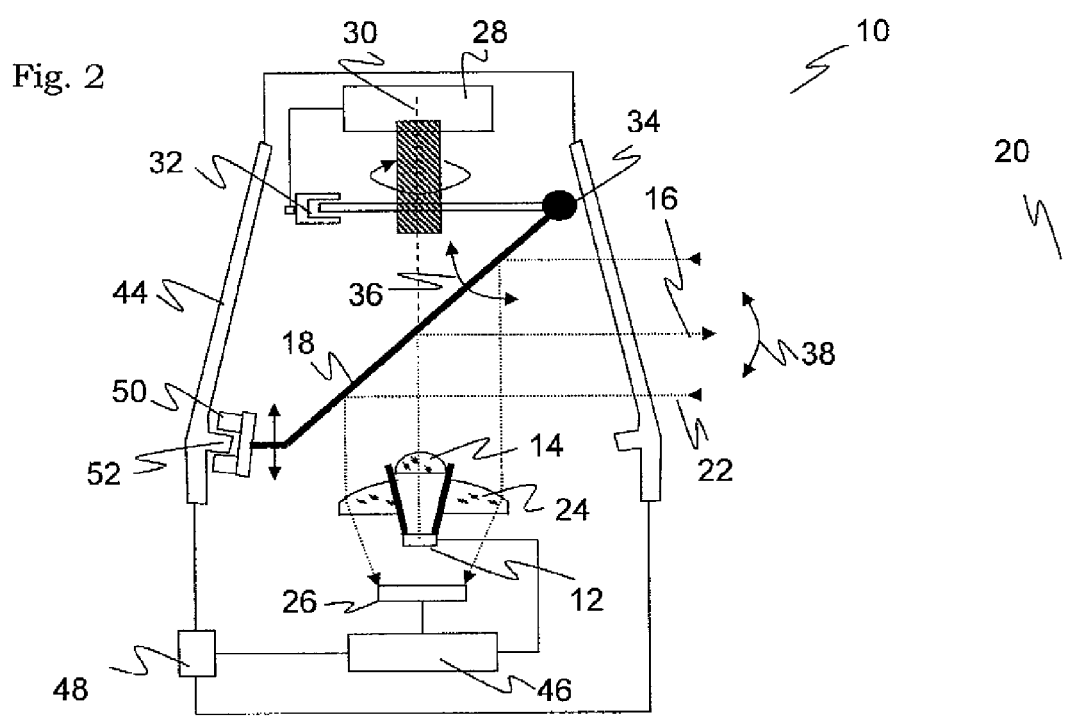
Figure 3A:
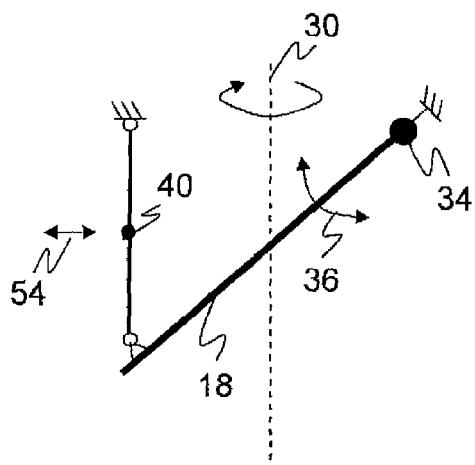
Figure 3B:
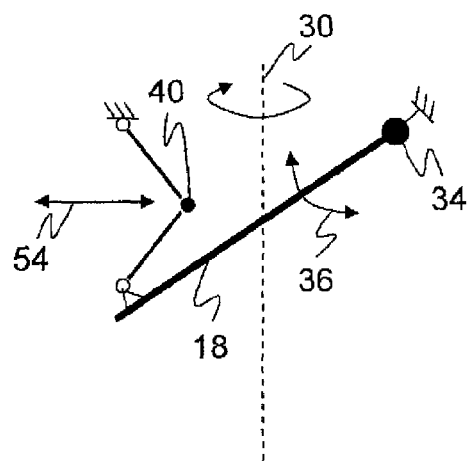
Figure 4A:
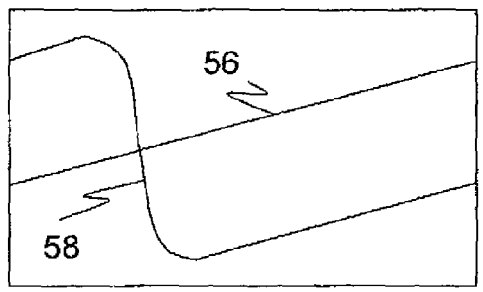
Figure 4B:
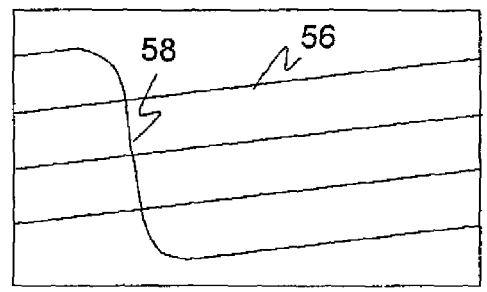
Figure 4C:
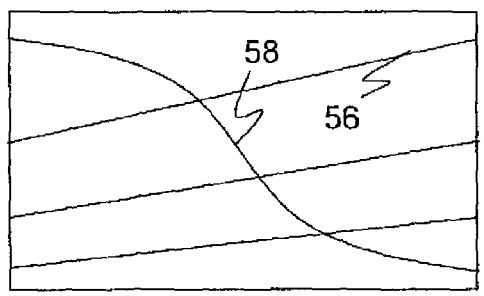
Figure 4D:
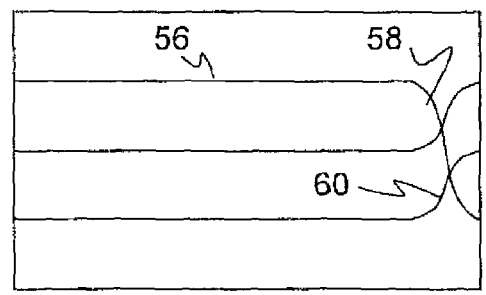
Figure 4E:
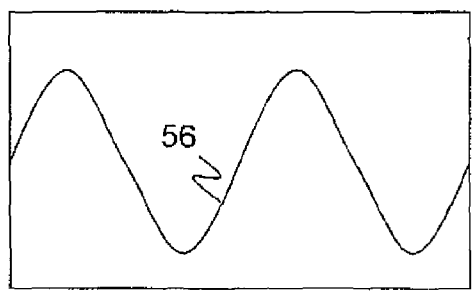
Figure 4F:
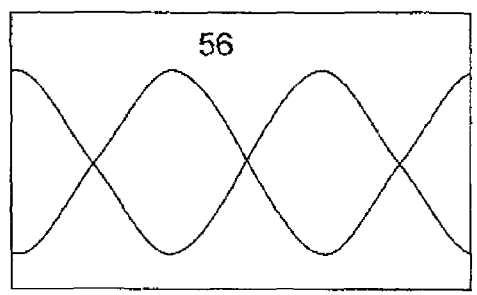
Figure 5A:
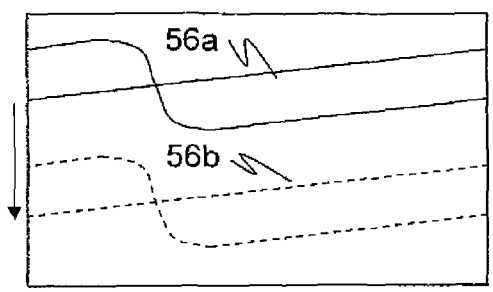
Figure 5B:
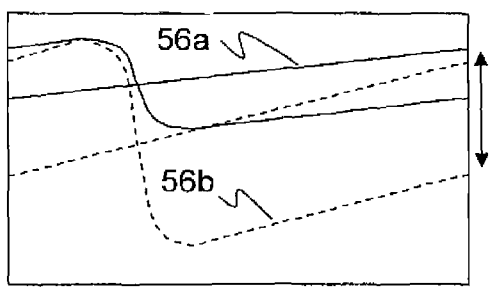
Figure 6A:
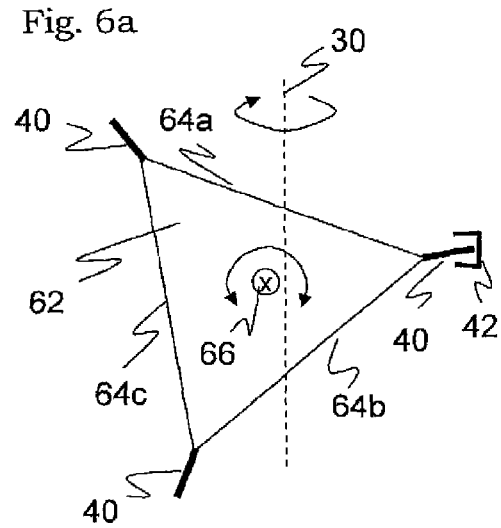
Figure 6B:
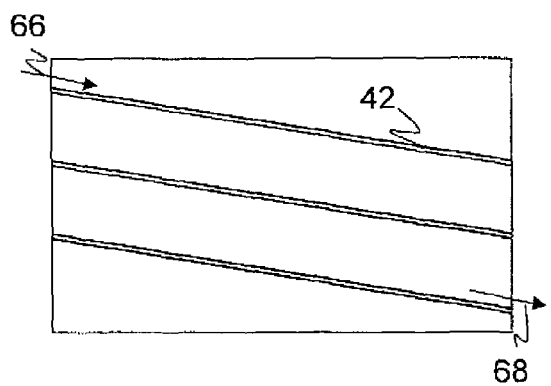

The invention will be described in detail in the following also with regard to further features and advantages by way of example with reference to embodiments and by means of the submitted drawing. The illustrations of the drawing show in:

FIG. 1 a sectional illustration of a laser scanner with a tilting of the deflection unit through an engagement of a spigot in a circumferential groove;

FIG. 2 a sectional illustration of a laser scanner with a tilting of the deflection unit through an engagement of guide rollers at a circumferential web;

FIG. 3a-b a sectional illustration of a laser scanner for explaining a compulsory guidance by way of Office Action relief section;

FIG. 4a a sectional track having two ascending straights and a return;

FIG. 4b a sectional track having four ascending straights and a return;

FIG. 4c a sectional track having three differently ascending straights and a return over a complete period of rotation;

FIG. 4d a sectional track having three horizontal part sections and a return;

FIG. 4e a sectional track having a periodic oscillation;

FIG. 4f a sectional track having two convoluted oscillations;

FIG. 5a a sectional track displaceable as a whole;

FIG. 5b an expandable and compressible sectional track;

FIG. 6a a sectional illustration of a laser scanner for explaining an edge-wise standing scanning mirrored wheel as a deflection unit rotating in an inclined manner due to a compulsory guidance; and FIG. 6b a sectional track for the compulsory guidance of the mirrored wheel in accordance with FIG. 6a.

FIG. 1 shows a sectional illustration of a laser scanner 10. Divers different arrangements of the individual elements of an optoelectronic sensor for the detection of objects are plausible and are comprised by the invention. The illustration shall thus only be understood by way of example.

A light transmitter 12, for example an LED or a laser diode transmits a transmission light beam or a scanning beam 16 via transmission optics 14 which scanning beam exits from the laser scanner 10 into a monitored zone 20 following the deflection at a deflection unit 18. If an object is scanned by the transmission light beam 16 then reflected or remitted light 22 returns back to the laser scanner 10 and is bundled on a light receiver by a reception optics 24 following a renewed deflection at the deflection unit 18.

A drive 28 displaces the deflection unit 18 into a rotational movement with respect to an axis of rotation 30. The respective angular position is determined by an encoder 32. During the course of the rotational movement the scanning beam 16 would scan a perpendicular scanning plane with respect to the axis of rotation 30 at a constant tilt angle between the deflection unit 18 and the axis of rotation 30.

The deflection unit 18 is, however, tiltably stored at a joint position 34 as is indicated by an arrow 36 which leads to an angular deviation of the scanning beam 16 which is indicated by an arrow 38. Thus, a spatial zone is captured by means of a scanning curve in contrast to a simple scanning plane which curve depends on the respective tilting.

The tilting is achieved through an engagement of a guide spigot 40 in a circumferential groove 42. Possible extents of the groove 42 are explained in more detail in the following with reference to the FIGS. 4 and 5. The groove 42 changes its height position measured in the direction of the axis of rotation 30 by means of the angle of rotation of the deflection unit 18. A change of the position in height is effected via the guide spigot 40 with respect to the angle of inclination or the angle of tilting of the deflection unit 18 in an angular dependent manner predefined by the groove 42.

The groove 42 can be provided in a housing part referred to as a cover 44 as illustrated. This enables a variation of the predefined tilting on an exchange of the cover 44 against a cover 44 having a different groove 42. Alternatively, the groove 42 can also be in engagement with a non-shown base part having a correspondingly downwardly rather than outwardly directed guide spigot 40. As a further alternative, a reversal is plausible in which the groove 42 rotates with the deflection unit 18 and the guide spigot is fixed at the housing and does not follow the rotation.

A control and evaluation unit 46 is connected to the light transmitter 12 and to the light receiver 26 in order to generate a transmission light beam 16 and to evaluate a received signal generated in the light receiver 26 from remitted light 22. During this evaluation it is determined whether an object was detected. The control and evaluation unit 46 moreover controls the drive 28 and receives the angular signal of the encoder 32, wherein corresponding connections have not been illustrated for reasons of clarity.

Preferably the control and evaluation unit 46 also carries out a determination of position together with the detection of the objects. For this purpose, the three spherical coordinates are determined. The distance is measured by means of the time of light method mentioned in the introduction. The first angle with respect to the rotational movement for the detection of an object is directly known to the encoder 32. The second angle is determined by the control and evaluation unit 46 as the tilt angle, which the groove 42 generates on the respective angular position of the deflection unit 18. For this purpose the geometry of the groove 42 is either taught or parameterized. This tilt angle can have a larger dependency region than 360°, in so far as the groove 42 extends over a plurality of revolutions. In this case the control and evaluation unit 46 must also consider the number of complete revolutions within the groove 42. In this connection it can be supportively recognized via a point of reference or a trigger, when the guide spigot 40 runs through the corresponding part of the groove 42. The desired result of the evaluation is provided at an output 48, be it, for example, as a binary object determination signal, in particular for safety relevant applications, as an object list with coordinates of the detection or as a two- and/or three-dimensional raw image.

FIG. 2 shows a sectional illustration of a further embodiment of the laser scanner 10. Like in all other further Figures, the same reference numerals relate to the same features or features corresponding to one another. The difference to the laser scanner 10 in accordance with FIG. 1 consists in the kind of engagement which tilts the deflection unit in a compulsory guided manner in the course of the rotational movement. A force-free guidance in the form of guide rollers 50 is provided in this example which grip around a web 52 instead of a guide spigot 14 in a groove 42. Otherwise, the assembly and the functional principle correspond to that of the laser scanner 10 explained with reference to FIG. 1 and include the possible variants of embodiments.

FIG. 3 shows a sectional illustration of a further embodiment of a laser scanner 10. In this connection, only the deflection unit 18 having a suspension and a compulsory guidance is illustrated. The guide element 40 in this example does not run in a groove 42 which brings about a shift in height determined in the direction of the axis of rotation 40, but rather has a circumferential relief section which is only indicated by an arrow 54. The relief section displaces the guide element 40 in dependence on the position of rotation of the deflection unit to a different degree towards the inside with respect to the axis of rotation 30. These two cases of the FIG. 3a and the FIG. 3b illustrate only a minimal lifting of the deflection unit 18 for a small deflection of the guide spigot 40 due to a small relief strength and a strong lifting of the deflection unit 18 for a large deflection of the guide spigot 40 due to a larger relief strength. Correspondingly, the relief images itself onto the tilt angle. Such a relief section can be predefined for the tilt angle or can be superimposed onto an extent in height, like the groove 42 in FIG. 1 or the web 52 in FIG. 2.

FIG. 4 shows different examples of sectional tracks 56 which predefine the tilt angle which depends on the rotational position of the deflection unit 18 as grooves 42, webs 52 and/or relief sections. In this connection, the sectional tracks 56 are respectively shown as a jacket surface of a cover 44. Corresponding sectional tracks 56 for embodiments of the compulsory guidance in the base which are not circumferential are possible in an analog manner and are not illustrated or explained individually. The sectional track 56 codes the scanning pattern in hardware and can be changed through variants of the cover 44.

FIG. 4a shows an example of a sectional track 56 having two uniformly ascending straights and a return 58. Due to the illustration as a jacket surface one must consider the sectional tracks 56 at the lateral edges as merging into one another. The sectional track 56 ending at the right hand side is thus continued respectively at the left hand side at the same height. Thus, these are not actually a plurality of separate part pieces, but only a single continuous sectional track 58. Correspondingly, the sectional track 56 ascends during the scanning through a rotation of the deflection unit 18 and on the compulsory guidance by the sectional track 56 the tilt angle increases uniformly via two rotations and is returned into the starting position in the return 58 over a comparatively short angular region for the next scanning period. The scanning beam 16 describes a uniformly ascending spiral which does not extend completely over 720° due to the return 58 in the monitored spatial zone.

FIG. 4b shows a different embodiment of a sectional track 56 having four uniformly ascending straights and a return 58. Otherwise, this embodiment does not differ from that of FIG. 4a.

For the example shown in FIG. 4c three straights have different ascents with respect to one another. In this way, different spatial zones are scanned with different resolutions in the tilt angle direction. The return 58 is not reintroduced into the 360° region of one of the straights, but rather more requires an own revolution of the deflection unit 18. Thereby, too fast or even jerky changes in direction can be avoided.

The respective horizontal part sections are provided in FIG. 4d. In this way a multi-planar scanner is achieved which detects a plurality of planes within the horizontal part sections which are tilted with respect to one another by an angle predefinable through the distance of the horizontal part sections. In an analogy to the return 58 also provided in this example short ascending regions 60 between the horizontal part sections serve for a change from one plane to the next.

The thought model of a merely tilted scanning plane based on a 2D scanner is completely deviated from in the embodiments in accordance with FIG. 4e-f. In contrast to this, the space-like monitored zone 20 is scanned using a sinusoidal pattern in which the tilt angle and the angle of rotation are commonly constantly varied. FIG. 4e shows a simple oscillation which is already completed after a complete revolution of the deflection unit 18, FIG. 4f shows an example of in this case two encapsulated oscillations which each extend over a plurality of revolutions.

The sectional tracks 56 of the FIG. 4 are examples and can be generalized to free curves which include one or more of the comparatively simple shown geometries as a basic component and can be combined differently or can be defined completely freely. Also the return 58 can take place in a different manner, in particular selectively within a revolution of the deflection unit 18, for example, in an anyway unused rear dead zone of the laser scanner 10 or in a revolution especially provided for this.

The sectional tracks 56 are preferably matched to the application through an exchange against a cover 44 having the desired sectional track 56. Instead of such a "hard groove coding" also a different adaption possibility can be provided.

The principle for this is shown by the sectional tracks 56 in FIG. 5. These sectional tracks 56 can, as illustrated in FIG. 5a be displaced into a sectional track 56b in a configured position illustrated with the dotted lines from a sectional track 56a in a starting position shown with a continuous line by means of setting screws. A rescaling through rotation or compression of a sectional track 56 into a starting position into a sectional track 56b having the desired extent in the height direction is additionally or alternatively plausible in accordance with FIG. 5b. This can be achieved through the use of an expandable material as a foundation for the sectional track 56.

FIG. 6a shows a sectional illustration for a further embodiment of the laser scanner 10. In this connection, the deflection unit 18 currently generally configured as a simple mirror is replaced by a mirrored wheel 62 having two, three or more facets 64a-c. In contrast to what is usual for a mirrored wheel, the mirrored wheel 62 is not inserted with its own axis of rotation 66 being in the axis rotation 30 of the laser scanner 10 but rather more transverse and, in particular perpendicular thereto so to say on edge. For this reason, the drive 28 rotates the mirrored wheel 62 primarily with the axle bearing with its own axis of rotation 66 about the axis of rotation 30 and in this way perpendicular to its own axis of rotation 66. This primary rotation superimposes with a two-fold rotation about the own axis of rotation 66 in such a way that the mirrored wheel 62 finally carries out a kind of inclined rotation due to the tilting in accordance with the invention in a compulsory guide. It is possible and also advantageous, but not necessary, for the avoidance of imbalances or erroneous alignments, when the axis of rotation 66 of a mirrored wheel 62 cuts the axis of rotation 30 of the laser scanner 10 and for this reason is illustrated differently in FIG. 6a.

The mirrored wheel 62 thus not only serves to scan a small angular region a multiple of times, as is common for a revolution using a plurality of facets 64a-c. Rather more a respective facet 64a-c acts like a simple mirror, as a deflection unit 18 is, however, tilted there between and, on achieving a maximum tilt angle, is replaced by the next facet 64a-c. The tilt movements of the mirrored wheel 62 required for this purpose are brought about by alternating engagements of guide elements 40 in a groove 42.

FIG. 6b shows a jacket surface of the groove 42 used for this purpose. It is composed of continuous straights each having a constant gradient. Arrows 66 and 68 refer to a running in and a running out of the respective active guide elements producing the compulsory guided engagement. When the active guide spigot 40 arrives at the running out the next guide spigot 40 then comes into engagement as an active guide spigot in the running in with the groove 42 and thus guides the subsequent facet 64a-c of the mirrored wheel 62. In this connection the running in and running out can be precisely coordinated with one another and take place at the same time. However, also a short overlap in time with two engaged guide spigots 40 just like a short idle time without a complete engagement of the guide spigots 40 is plausible.

Correspondingly, the mirrored wheel 62 carries out a complete uniform superimposed rotational movement and tilting movement which results in an inclined rotation and does not require an interfering return reversal of the movement direction. The return is replaced by the alternative engagement of the guide elements 40. Thereby, particularly at high frequencies of rotation a smoother movement with less accelerations results.

The mirrored wheel 62 is illustrated in a uniform manner. Each facet 64a-c thus scans the uniform monitored zone 20 using the same pattern. The facets 64a-c can also be tilted with respect to one another or be designed in a different manner in such a way that displaced or different scanning patterns and/or monitored zones 20 result per facet 64a-c. Likewise, one can deviate from the completely uniform groove 42, as long as the less smooth movement sequence of the mirrored wheel 62 is accepted or compensated. In principle, arbitrary curves, as explained with reference to FIG. 4 come into question for this purpose and likewise also variations of the compulsory guided engagement, such as e.g. in that the guide elements 40 and the groove 42 are replaced by guide rollers 50 and a web 52.

The invention claimed is:

1. An optoelectronic sensor (10) for the detection of objects in a monitored zone (20) having more than one scanning plane, which comprises a light transmitter (12) for the transmission of a light beam (16), a drive (28) for the generation of a rotational movement, a deflection unit (18, 62) rotatable about an axis of rotation (30) by means of the drive (28) for the periodic deflection of the light beam (16), a light receiver (26) for the generation of a received signal from the light beam (22) remitted or reflected from the monitored zone (20), and an evaluation unit (46) which is configured for the detection of the objects on the basis of the received signal, wherein the deflection unit (18, 62) can be tilted in order to vary the scanning plane,
wherein the drive (28) tilts the deflection unit (18, 62) at the same time as the rotational movement,
the optoelectronic sensor further comprising a compulsory guidance (40, 42, 50, 52) which determines a respective tilt angle in dependence on the rotational movement,
wherein the compulsory guidance (40, 42, 50, 52, 54) has an engagement between a guide element (40, 50) connected to the deflection unit (18, 62) and a sectional track (40, 50, 54, 56) not following the rotational movement of the deflection unit (18) or has an engagement between a sectional track (40, 50, 54, 56) arranged at the deflection unit (18, 62) and a guide element (40, 50) not following the rotational movement.

2. The sensor (10) in accordance with claim 1, wherein the sensor is a laser scanner.

3. The sensor (10) in accordance with claim 1, wherein the deflection unit (18) is supported at a joint position (34) opposite to the engagement.

4. The sensor (10) in accordance with claim 1, wherein the deflection unit is a mirrored wheel (62) having a plurality of facets (64a-c) whose axis (66) is arranged transverse to the axis of rotation (30).

5. The sensor (10) in accordance with claim 4, wherein the mirrored wheel (62) has a plurality of facets (64a-c) whose axis (66) is arranged perpendicular to the axis of rotation (30).

6. The sensor (10) in accordance with claim 4, wherein the facets (64a-c) have different lengths and/or are tilted differently with respect to the axis (66).

7. The sensor (10) in accordance with claim 4, wherein the deflection unit (62) has a plurality of guide elements (40) which are alternatively in engagement with a sectional track (42, 52, 54, 56).

8. The sensor (10) in accordance with claim 1, wherein the sectional track has a groove (42) and the guide element has a spigot (40) running in the groove (42).

9. The sensor (10) in accordance with claim 8, wherein the guide element has two guide rollers gripping around the web (52).

10. The sensor (10) in accordance with claim 1, wherein the sectional track has a web (52) and the guide element has at least one guide roller.

11. The sensor (10) in accordance with claim 1, wherein the sectional track varies the distance with respect to the axis of rotation (30) in a relief section (54).

12. The sensor (10) in accordance with claim 1, wherein the sectional track (56) has an ascending straight and a return (58).

13. The sensor (10) in accordance with claim 1, wherein the sectional track (56) has a plurality of horizontal part sections connected by short ascents (60).

14. The sensor (10) in accordance with claim 1, wherein the sectional track (56) comprises at least one periodic oscillation.

15. The sensor (10) in accordance with claim 14, wherein the at least one periodic oscillation comprises at least one sinusoidal curve.

16. The sensor (10) in accordance with claim 1, wherein the sectional track (56a, 56b) comprises a setting element in order to displace, to expand or to compress the sectional track (56a, 56b).

17. A method for the detection of objects in a monitored zone (20) having more than one scanning plane, comprising
transmitting and periodically deflecting a light beam (16) by means of a deflection unit (18, 62),
displacing into a rotational movement by means of a drive (28) and
receiving again following a remission or reflection at the object in order in this connection to obtain information on the scanned object on the basis of a generated received signal,
wherein the deflection unit (18, 62) is tilted in order to vary the scanning plane, wherein the deflection unit (18, 62) is transferred into a rotational movement and tilted at the same time by the same drive (28), and further comprising determining a respective tilt angle in dependence on the rotational movement by a compulsory guidance (40, 42, 50, 52), wherein the compulsory guidance (40, 42, 50, 52, 54) has an engagement between a guide element (40, 50) connected to the deflection unit (18, 62) and a sectional track (40, 50, 54, 56) not following the rotational movement of the deflection unit (18) or has an engagement between a sectional track (40, 50, 54, 56) arranged at the deflection unit (18, 62) and a guide element (40, 50) not following the rotational movement.

18. An optoelectronic sensor (10) for the detection of objects in a monitored zone (20) having more than one scanning plane, which comprises a light transmitter (12) for the transmission of a light beam (16), a drive (28) for the generation of a rotational movement, a deflection unit (18, 62) rotatable about an axis of rotation (30) by means of the drive (28) for the periodic deflection of the light beam (16), a light receiver (26) for the generation of a received signal from the light beam (22) remitted or reflected from the monitored zone (20), and an evaluation unit (46) which is configured for the detection of the objects on the basis of the received signal, wherein the deflection unit (18, 62) can be tilted in order to vary the scanning plane, wherein the drive (28) tilts the deflection unit (18, 62) at the same time as the rotational movement, wherein the deflection unit is a mirrored wheel (62) having a plurality of facets (64*a-c*) whose axis (66) is arranged transverse to the axis of rotation (30).

* * * * *